US008356343B1

(12) United States Patent
Breau et al.

(10) Patent No.: US 8,356,343 B1
(45) Date of Patent: Jan. 15, 2013

(54) SESSION CONTINUITY ON REAUTHENTICATION

(75) Inventors: Jeremy R. Breau, Kansas City, MO (US); John E. Belser, Olathe, KS (US); Arun Santharam, Olathe, KS (US); Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 869 days.

(21) Appl. No.: 12/024,663

(22) Filed: Feb. 1, 2008

(51) Int. Cl.
*H04L 29/06* (2006.01)
(52) U.S. Cl. ........... 726/12; 713/153; 709/227; 709/228
(58) Field of Classification Search .................... 726/12; 713/153; 709/227, 228
See application file for complete search history.

(56) References Cited

U.S. PATENT DOCUMENTS

| 6,571,289 | B1 * | 5/2003 | Montenegro | 709/227 |
|---|---|---|---|---|
| 6,795,857 | B1 * | 9/2004 | Leung et al. | 709/224 |
| 7,065,067 | B2 * | 6/2006 | Song et al. | 370/338 |
| 7,409,549 | B1 * | 8/2008 | Leung et al. | 713/168 |
| 7,920,519 | B2 * | 4/2011 | Oswal et al. | 370/331 |
| 2004/0176095 | A1 * | 9/2004 | Yamada et al. | 455/445 |
| 2005/0053034 | A1 * | 3/2005 | Chiueh | 370/331 |
| 2006/0019708 | A1 * | 1/2006 | Raman et al. | 455/561 |
| 2006/0045080 | A1 * | 3/2006 | Islam et al. | 370/389 |
| 2007/0260885 | A1 * | 11/2007 | Yegani et al. | 713/171 |
| 2008/0039079 | A1 * | 2/2008 | Iyer et al. | 455/432.1 |

OTHER PUBLICATIONS

Jason P. Jue and Dipak Ghosal, Design and analysis of a replicated server architecture for supporting IP-host mobility,Department of Electrical and Computer Engineering, University of California, Davis, CA 95616, USA vol. 1, No. 2 (1998), 249-260, DOI: 10.1023/A:1019097818667.*
Diameter Extensible Authentication Protocol (EAP) Application; RFC: 4072; Network Working Group; P. Eronen, Ed., T. Hiller; G. Zorn; Aug. 2005.
Extensible Authentication Protocol (EAP); RFC: 3748; Network Working Group; B. Aboba; L. Blunk, J. Vollbrecht, J. Carlson, H. Levkowetz, Ed.; Jun. 2004.
RADIUS (Remote Authentication Dial in User Service) Support for Extensible Authentication Protocol (EAP); RFC: 3579; Network Working Group; B. Aboba, P. Calhoun; Sep. 2003.
IP Mobility Support for IPv4; RFC: 3344; Network Working Group; C. Perkins, Ed.; Aug. 2002.
WiMAX Forum Network Architecture (Stage 3: Detailed Protocols and Procedures); Release 1.0.0, WiMAX Forum; Mar. 28, 2007.

* cited by examiner

*Primary Examiner* — Carl Colin
*Assistant Examiner* — Ali Shayanfar

(57) ABSTRACT

A method, system, and computer-readable medium are provided for maintaining a network session between a network element and a network despite the need to reauthenticate the network element. A computer-implemented method is provided for authenticating a network element to a network. According to this method, an authentication request is transmitted to the network element. In response, the network element provides identifying information for a home agent that previously routed messages to the network element. The identifying information is then used to generate a mobility key. Later, when a network registration request message is received on behalf of the network element, the generated key is used to validate the request.

13 Claims, 5 Drawing Sheets

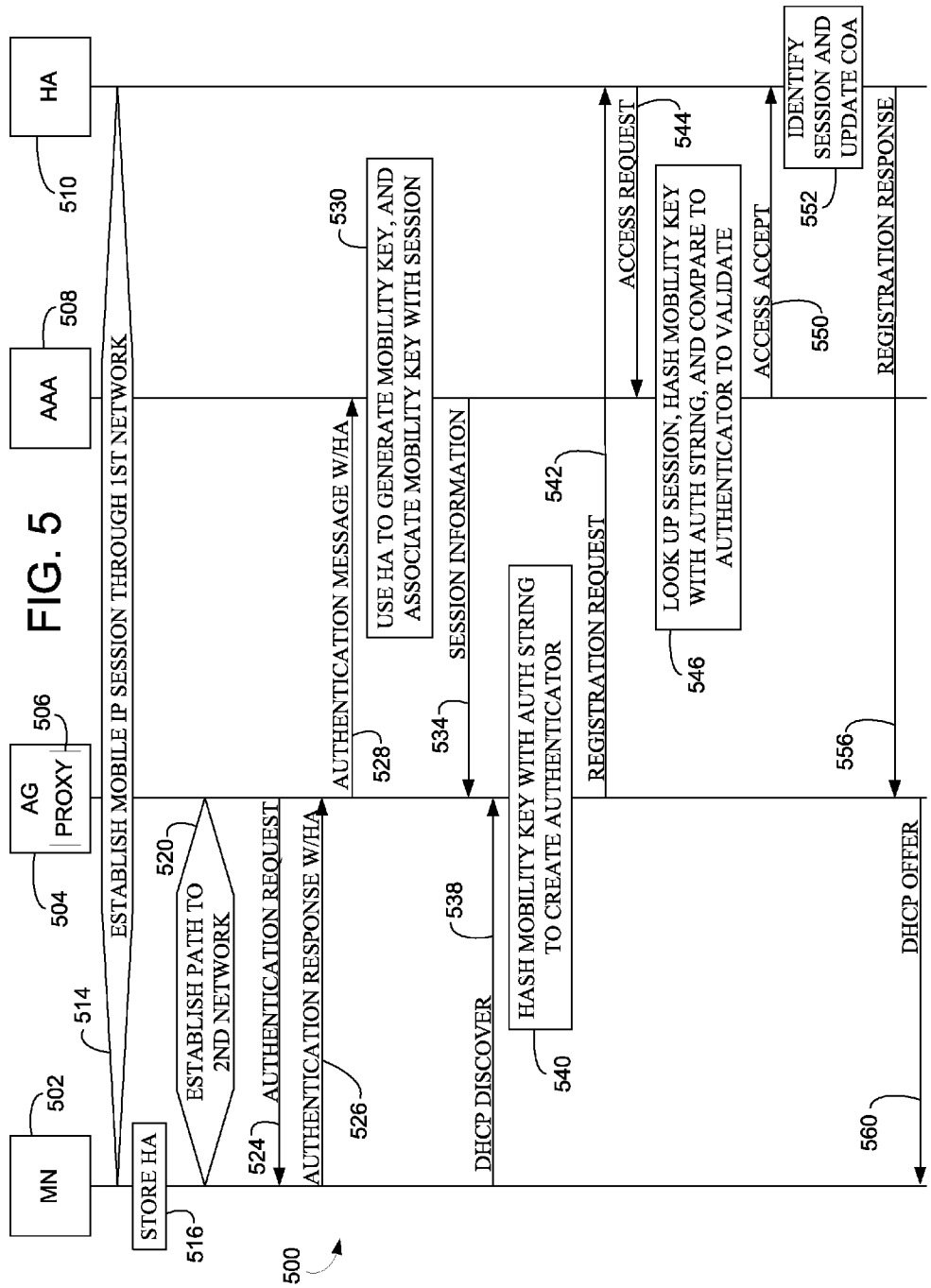

SESSION CONTINUITY ON REAUTHENTICATION

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention provides systems, methods, and computer-readable media for maintaining a network session between a network element and a network despite the need to reauthenticate the network element. In one aspect of an embodiment of the present invention, a computer-implemented method is provided for authenticating a network element to a network. According to this method, an authentication request is transmitted to the network element. In response, the network element provides identifying information for a home agent that previously routed messages to the network element. The identifying information is then used to generate a mobility key. Later, when a network registration request message is received on behalf of the network element, the generated key is used to validate the request.

In another aspect of an embodiment of the present invention, a system is provided for maintaining a mobile IP session between a mobile device and a network after the mobile device changes its point of attachment to the network. The system includes: a home agent with a number of home addresses to assign to mobile devices; a mobile node, which was previously served be the home agent and assigned on of these home addresses; and an assignment gateway. The mobile node is configured to store the identity of the home agent and pass it to the assignment gateway in response to an authentication request. In turn, the assignment gateway is configured to recognize the home agent identified in the response and reassign that home agent to again serve the mobile node, thereby maintaining the mobile IP session between the mobile node and the network.

In yet another aspect of an embodiment of the present invention, a computer-readable medium is provided, embodying a method for maintaining a mobile IP session between a mobile node and a home network when the mobile node moves to a new foreign network utilizing proxy mobile IP. According to this method, the mobile node first establishes a mobile IP session via a first foreign network, in which the mobile node is served by a particular home agent that tunnels messages to the mobile node via the first foreign network. The mobile node is also assigned a particular home address. Later, the mobile node establishes a connection with a second foreign network and, in response to an authentication request from that network, provides the IP address of the home agent. The IP address of the home agent is then used to generate a mobility key. Later, when a network registration request is received on behalf of the mobile node, the generated key is used to validate the request and authenticate the mobile node. Finally, the same home agent is assigned to tunnel messages to the mobile node via the second foreign network, and the same home address is assigned to the mobile node, thereby maintaining the mobile IP session.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter. The invention is defined by the claims below.

BRIEF DESCRIPTION OF THE DRAWINGS

Illustrative embodiments of the present invention are described in detail below with reference to the attached drawing figures, wherein:

FIG. 5 illustrates a message flow diagram showing an example of network session setup signaling in accordance with an embodiment of the present invention.

DETAILED DESCRIPTION

Figure 1:
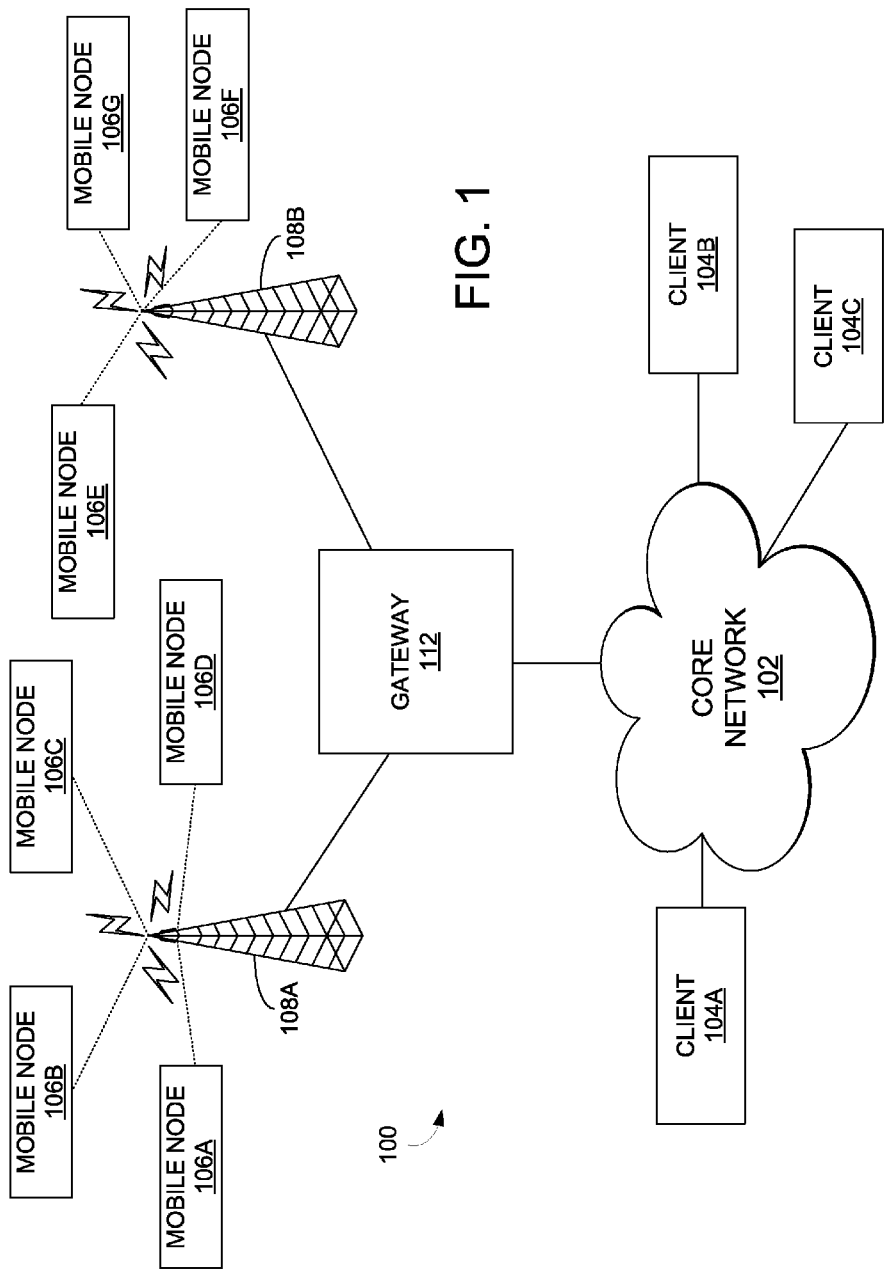
FIG. 1 is a block diagram of a network environment suitable for use in implementing the present invention.

Embodiments of the present invention include systems and methods for maintaining a network session between a network element and a network despite the need to reauthenticate the network element to the network. Various applications of the invention are possible, including the maintenance of a mobile IP session between a mobile node and a home network when the mobile node moves from one foreign network supporting client mobile IP to another foreign network supporting proxy mobile IP.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| DVD | Digital Versatile Disc |
| PDA | Personal Digital Assistant |
| IP | Internet Protocol |
| IPv4 | Internet Protocol Version 4 |
| MN | Mobile Node |
| HA | Home Agent |
| AG | Access Gateway |
| CDMA | Code Division Multiple Access |
| IEEE | Institute of Electrical and Electronics Engineers |
| WiMAX | Worldwide Interoperability for Microwave Access |
| EAP | Extensible Authentication Protocol |
| AAA | Authentication, Authorization, and Accounting Server |
| HOA | Home Address |

Further, various technical terms are used throughout this description. An illustrative resource that fleshes out various aspects of these terms can be found in *Newton's Telecom Dictionary* by H. Newton, 22$^{nd}$ Edition (2006).

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline (wired). As will be appreciated by those skilled in the art, communication networks may take several different forms and may use several different communication protocols. And the present invention is not limited by the forms and communication protocols described herein.

Mobile nodes are network elements that may change location and attach to different networks or different parts of the same network. These devices may connect to networks using various access technologies, both wireless and wireline. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMAX (Worldwide Interoperability for Microwave Access). WiMAX, also known as the IEEE 802.16 group of standards, defines a packet-based wireless technology that provides high-throughput broadband connections over long distances. The present invention is not limited by the access technologies described herein.

Communications between a network element and a network may be organized into network sessions. These sessions generally have a beginning (session initiation) and an end (session termination). During a network session, certain session information is maintained to support communication between the network element and the network. This session information may include network addresses, connections, streams, or any combination of these or other constructs.

Mobile IP sessions are an example of such organization, in which a home address for a mobile node is maintained throughout the session, even when the mobile node changes locations and network attachment points. Home agents may be employed to tunnel messages from a home network to one or more foreign networks where the mobile node may currently be found. Home agents may deliver such messages to a care-of address on the foreign network, which may correspond to the mobile node itself (client mobile IP), or a proxy responsible for delivering the message to the mobile node (proxy mobile IP). In some such embodiments, home addresses are explicitly tied to a particular home agent. In these embodiments, the same home agent is generally utilized when a mobile node moves to a new foreign network so that the same home address is still available for the mobile node, thereby maintaining session continuity. For further information regarding an embodiment of mobile IP, see RFC 3344, incorporated herein by reference.

Authentication protocols may be used to ensure the security of wireless and wireline networks. Various protocols are well known in the art, which provide various methods of validating the identity of a network element as well as ensuring that a network message was not intercepted and changed enroute. Some such protocols utilize dynamic mobility keys, which are hashed with a portion of a message (known as an auth. string) to create a message authenticator value. The authenticator value may then be recreated and compared by a network authenticating element to validate the network message. In some such protocols, the identity of a home agent serving a network element is used to create one or more of the dynamic mobility keys used to authenticate the element to the network. In networks utilizing such protocols, the identity of the home agent to be used must generally be available at the time the dynamic mobility keys are first generated. Extensible Authentication Protocol (EAP) is one example of such a protocol, although other protocols may be used with the present invention. For illustrative information regarding a few such authentication protocols, see RFCs 3579, 3748, and 4072, incorporated herein by reference.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only an exemplary network environment.

The network environment 100 includes a core network 102. The network 102 may be any network or combination of networks configured to provide communications between network elements. The network 102 provides communication services for clients 104A-104C. The clients 104A-104C may be any computing devices connected to the network 102, and each of the clients 104A-104C may have an address, such as an IP address, for uniquely identifying that client. The clients 104A-104C may interact with the network 102 to receive a variety of content such as voice, data or video.

The network environment 100 may also include a wireless communication system configured to provide communication services to mobile nodes 106A-106G. In an exemplary wireless communication system, each mobile node 106A-106G may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile nodes 106A-106G.

In order to facilitate network sessions originating from the mobile nodes 106A-106G, the network environment 100 includes a gateway 112. As known to those skilled in the art, the gateway 112 may provide a variety of functions allowing clients to communicate with the core network 102. Such functions may vary based on the type of access technology being utilized by an originating mobile node. The access gateway 112 may receive communication requests from the mobile nodes 106A-106G, authenticate the clients, and assign network addresses.

Figure 2:
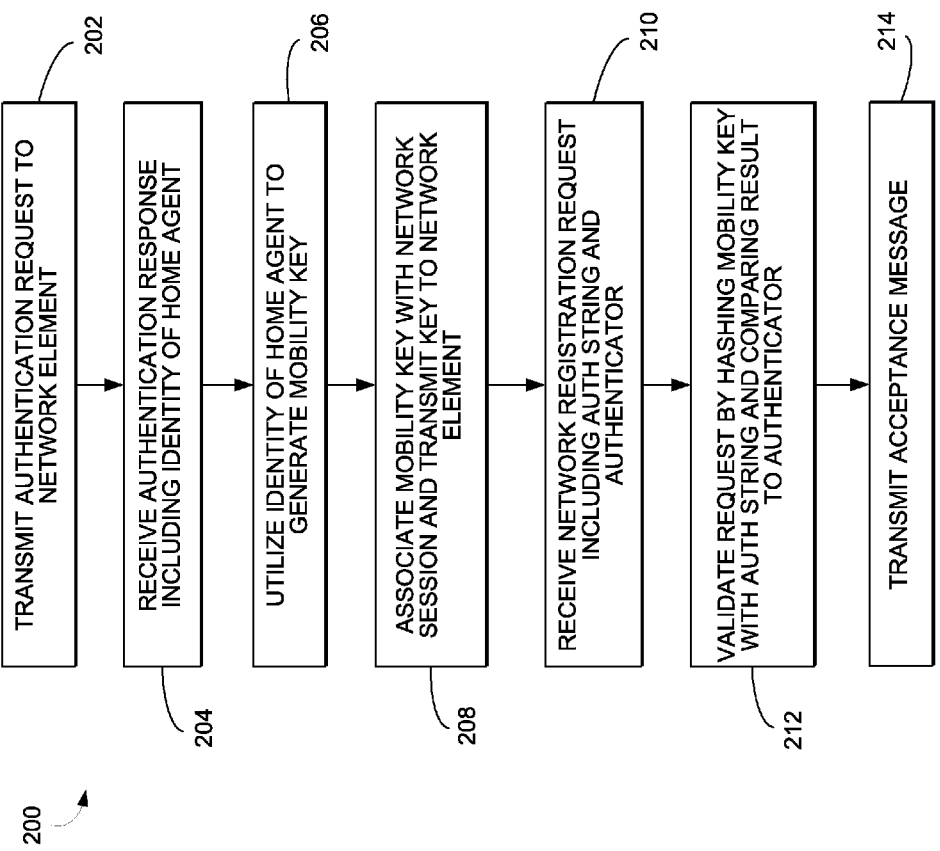
FIG. 2 illustrates a method for authenticating a network element to a network in accordance with an embodiment of the present invention.

FIG. 2 illustrates a method 200 for authenticating a network element to a network in accordance with an embodiment of the present invention. At a step 202, an authentication request is transmitted to a network element, such as any of clients 104A-C or mobile nodes 106A-G of FIG. 1. The authentication request may be formatted in accordance with any number of authentication protocols, including but not limited to EAP. As further discussed below, various events may trigger the need to authenticate the network element to the network. For example, authentication may be triggered when the network element changes its point of attachment to the network, attaches to a new network, or changes access technologies, among other events. For example, the authentication method described may be triggered when a dual mode network device moves from CDMA to WiMAX.

At a step 204, an authentication response is received from the network element. Again, the authentication response may be formatted in accordance with any number of authentication protocols, including but limited to EAP. The authentication response may also be passed through a proxy before reaching the component which performs the step 204. Such a proxy may translates the response from one protocol to another. For example, the authentication response may be translated from EAP to RADIUS or DIAMETER, among other protocols. The authentication response may include identifying information for a home agent that previously served to route messages to the network element. Various information may serve to identify the home agent, including but not limited to an IP or MAC address associated with the home agent. This information may be included in the authentication response message by way of an extension on the message format, such as a attribute value pair or a type length value extension. Alternatively, the information may be included by decorating an existing attribute passed as part of the authentication message. For example, a special character may be added to a session identifier attribute followed by the home agent information. Other methods for passing such information will be apparent to those skilled in the art.

At a step 206, the identifying information passed as part of the authentication response is recognized and used to generate a dynamic mobility key in accordance with the particular authentication protocol employed. In an embodiment of the present invention, the identifying information received in the step 204 may be used to identify the home agent, before different identifying information for the home agent is used to build the mobility key. Further, as is well known in the art, the mobility key may in turn be utilized to build additional, derivative mobility keys. At a step 208, the mobility key, or one or more of the derivative mobility keys, may be associated with a network session by way of a network session identifier. Further, some or all of the mobility keys may be passed to the network element of step 202 along with the network session identifier.

Later, at a step 210, a network registration request message is received including an auth. string and an authenticator value. As is well known in the art, the auth. string may comprise a portion of the network registration request message. The auth. string has been previously hashed with one of more of the mobility keys from the step 206 to create the authenticator value. The network session identifier from the step 208 may also be passed as part of the network registration request message. As further discussed below, the network registration request message may be received from the home agent of the step 206.

Next, at a step 212, the network registration request message is validated by again hashing the auth. string with the same mobility keys, and comparing the resulting hash value with the authenticator. As part of this step, the network session identifier may first be used to lookup the mobility keys in a session table. Finally, at a step 214 an acceptance message may be transmitted indicating that the network registration request message is valid. This acceptance message may transmitted to the home agent of the step 206 or another appropriate network element on the network.

Figure 3:
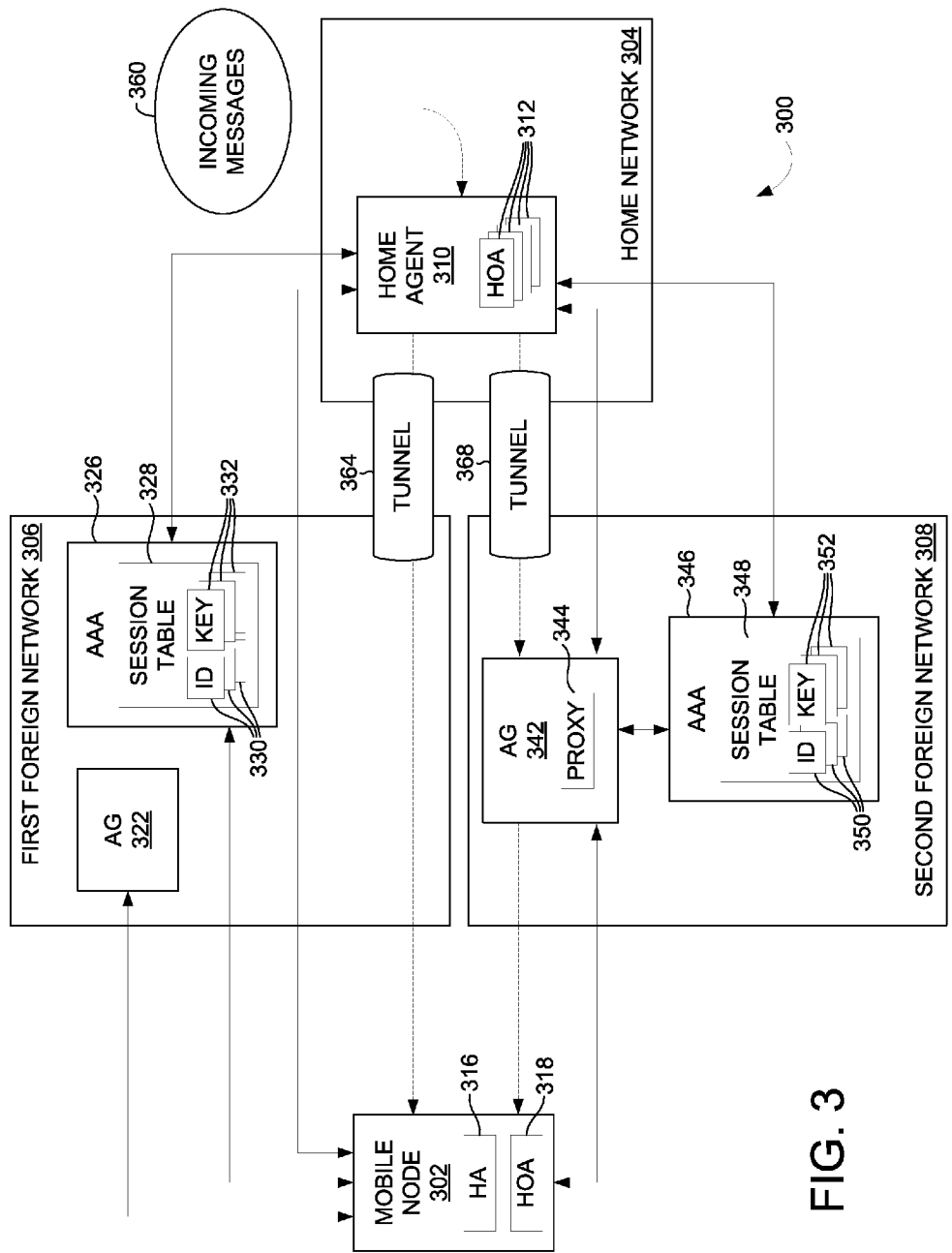
FIG. 3 is a block diagram of a system for maintaining a mobile IP session between a mobile node and home network when the mobile node moves between foreign networks in accordance with an embodiment of the present invention.

FIG. 3 represents an exemplary network 300 which illustrates a system for maintaining a mobile IP session between a mobile node 302 and home network 304 when the mobile node moves between a first foreign network 306 and a second foreign network 308 in accordance with an embodiment of the present invention. Networks in which the present invention may operate may be arranged in a variety of configurations and may contain additional components. FIG. 3 merely provides a simplified representation of such networks in order to illustrate an embodiment of a system in accordance with the present invention. In FIG. 3, arrows with solid lines represent session setup signaling and arrows with dashed lines represent the relaying of incoming messages 360 after setup. Session setup signaling will be described first.

In this example, the mobile node 302 first establishes a connection to the first network 306. As known to those skilled in the art, this process may occur by first establishing a path to an access gateway (AG) 322. The mobile node may also be required to authenticate to a Authentication, Authorization, and Accounting Server (AAA) 326, or some other authenticating element on the network. As part of this authentication process, the home agent 310 may be selected, from a number of available home agents, to serve the mobile node 302. This selection may be made by the AG 322, the AAA 326, or some other network element. Regardless, the AAA 326 may then generate a dynamic mobility key (key) 332 using an IP address associated with the home agent 310. As described in relation to the step 206 of FIG. 2, more than one mobility key may in fact be generated, but one key is depicted here to simplify the illustration. This key 332 may be associated with a network session identifier (ID) 330 and stored for later retrieval in a session table 328. The key could also be generated by the AG 322 or some other network element and passed to the AAA 326 or some other network authenticating element. The configurations shown and discussed here are merely illustrative examples, and other possible configurations will be apparent to those skilled in the art. Regardless, the ID 330, key 332, and the IP address of the home agent 310 may be passed back to the mobile node 302 at this time for later use.

Next, the mobile node 302 may attempt to register with the home agent 310 by transmitting a network registration request, such as a mobile IP registration request, to the home agent 310. As described in the step 210 of FIG. 2, the network registration request may comprise the ID 330, as well as an auth. string and an authenticator value. The home agent 310 may then attempt to validate the network registration request message by passing it to an authenticating element, such as the AAA 326, as part of an access request, or other authentication message. On receiving the network registration request, the AAA 326 may use the ID 330 to lookup the key 332 in the session table 332. The AAA 326 may then hash the key 332 with the auth. string and compare the resulting hash value with the authenticator, as described in the step 212 of FIG. 2. If the resulting hash value matches the authenticator value, the network registration message is found to be valid and an access accept message may be returned to the home agent 310.

Next, the home agent 310 selects a home address (HOA) 312 to assign to the mobile node 302 and returns a network registration response, such as a mobile IP registration response, to the mobile node. The network registration response may comprise the IP address of the home agent as well as the HOA 312 assigned to the mobile node 302. The mobile node 302 may then store these values for later use at memory locations HA 316 and HOA 318.

Now that the mobile IP session is established, as is known in the art, incoming messages 360 for the mobile node 302 may be addressed to the HOA 312. The home agent 310 then intercepts such messages on the home network 304 and tunnels them to the first foreign network 306 via the tunnel 364. The incoming messages 360 may then be delivered to a care-of address on the first foreign network 306. In this example, the care-of address points directly to the mobile node 302, which receives the messages via an interface with the first foreign network 306.

In this example, the mobile node 302 later establishes a connection to a second foreign network 308. Similar to the above described session setup process, the mobile node 302 may first establish a path to an AG 342. But instead of the mobile node 302 communicating directly with an authenticating element on the second foreign network 308, such as a AAA 346, the AG 342 may communicate on behalf of the mobile node 302 using a proxy function 344 in accordance with a proxy mobile IP protocol. The AG 342 may also act as an authenticator as described in WiMAX Forum Network Architecture Stage 3 Detailed Protocols & Procedures Release 1.0.0, Mar. 28, 2007, incorporated herein by reference. Thus, for example, the AG 342 may send a authentication request to the mobile node 302 on behalf of the AAA 346. But the proxy and authenticator functions described could also be housed on some other network element, or different network elements. The configurations shown and discussed here are merely illustrative examples, and other possible configurations will be apparent to those skilled in the art.

In response to the authentication request, as described above in the step 204 of FIG. 2, the mobile node 302 may return the IP address of the home agent 310, which was previously stored at memory location HA 316. The AG 324 may then recognize the IP address passed as part of the authentication response and assign the home agent 310 to again serve the mobile node 302, instead of selecting a home agent from those available, as described above.

Next, the AG 342 may pass the IP address of the home agent 310 to the AAA 346 as part of an authentication message. As described above in relation to the step 204 of FIG. 2, the AG 342 may translate the authentication response received from the mobile node 302 into a different message format the AAA 346 will comprehend before passing on this information. Regardless, once the AAA 346 receives the authentication message from the AG 342, the AAA 346 may recognize the IP address of the home agent 310 and use this information to generate a dynamic mobility key (key) 352. The key 352 may then be associated with a network session identifier (ID) 350 and stored for later retrieval in a session table 348.

Next, when the mobile node 302 seeks to discover an IP address, using a DHCP discover message or some other known protocol, the AG 342 may send a network registration request to the home agent 310 on behalf of the mobile node 302. As described above, the network registration request may comprise the ID 350. The home agent 310 may authenticate the network registration request message via the AAA 346 as described above. Further, the home agent 310 may recognize the previously established mobile IP session via the ID 350 or some other means. Thus, instead of assigning a new HOA 312, the home agent may just update its binding to associate the HOA 312 with a new care-of address on the second foreign network 308, thus maintaining the mobile IP session.

In operation, the home agent 310 may pass incoming messages 360 received on the home network 304 to the second foreign network 308 via tunnel 368. The incoming messages 360 may then be delivered to a care-of address on the second foreign network 308. In this example, the care-of address points to the AG 342, which receives the messages and forwards them on to the mobile node 302.

In the example depicted in FIG. 3 and described above, the mobile node 302 moves from a first foreign network 306, utilizing a client mobile IP protocol, to a second foreign network 308, utilizing a proxy mobile IP protocol. However, as one skilled in the art will appreciate, the present invention is equally applicable when a mobile node moves between two foreign networks that both utilize a proxy mobile IP protocol. The present invention may also be applicable when a mobile node, such as mobile node 302, changes the access technology it uses to communicate with the network 300. For example, the invention may be applied in order to support session continuity from a client mobile IPv4 CDMA connection to a proxy mobile IPv4 based WiMAX connection.

Figure 4:
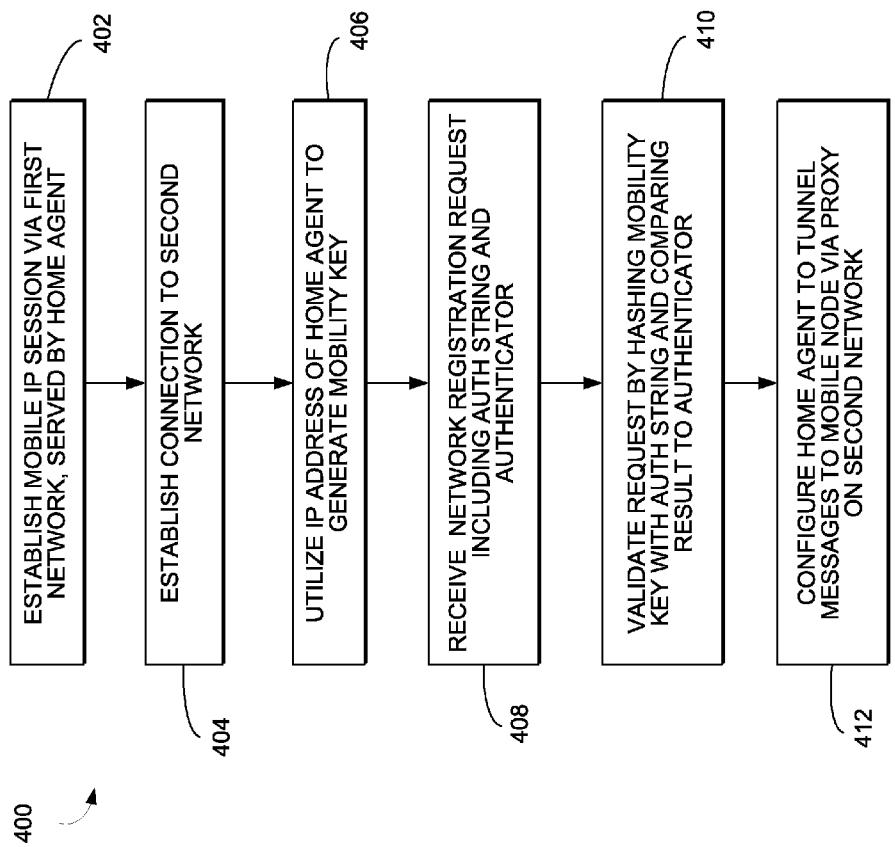
FIG. 4 illustrates a method for maintaining a mobile IP session between a mobile node and a home network when the mobile node moves to a foreign network utilizing proxy mobile IP in accordance with an embodiment of the present invention.

FIG. 4 illustrates a method 400 for maintaining a mobile IP session between a mobile node, such as the mobile node 302 of FIG. 3, and a home network, such as the home network 304 of FIG. 3, when the mobile node moves to a foreign network utilizing proxy mobile IP, such as the second foreign network 308 of FIG. 3.

At a step 402, a mobile IP session is established for a mobile node via a first network, such as the first foreign network 306 of FIG. 3. As discussed above, the mobile IP session may be established using either client mobile IP or proxy mobile IP protocols. Regardless, a home agent is thereby selected to route messages between the home network and the mobile node. As described above, the mobile node may store the IP address of the home agent at this step.

Later at a step 404, the mobile node establishes a connection to a second network. As described in relation to the steps 202 and 204 of FIG. 2, the second network may then attempt to authenticate the mobile node, and the mobile node may pass the IP address of the home agent to an authenticating element, such as the AAA 346 of FIG. 3. Next at a step 406, the authenticating element may utilize the IP address of the home agent to generate one or more mobility keys, as described in relation to the step 206 of FIG. 2.

Later, at a step 408, a network registration request is received by an authenticating element, such as the AAA 346 of FIG. 3. The network registration request may be sent by the home agent of the step 402 as part of an access request message. As described above in relation to the step 210 of FIG. 2, the network registration request may comprise an auth. string, consisting of part or all of the network registration request message, and an authenticator value.

At a step 410, the auth. string is hashed with one or more mobility keys from the step 406 to obtain a hash value. The hash value is then compared to the authenticator from the step 408, in order to validate the network registration request message. Finally, at a step 412, the home agent of the step 402 is reconfigured to route incoming messages to the mobile node via a proxy on the second network, such as AG 342 of FIG. 3. The mobile IP session between the mobile node and the home network is thereby maintained. The method 400 may then repeat from the step 404 if a connection is established to an additional network.

FIG. 5 illustrates a message flow diagram 500 showing an example of network session setup signaling in accordance with an embodiment of the present invention. The messages depicted in this diagram may be communicated amongst other network elements in addition to those depicted in the diagram 500. The diagram 500 merely provides a simplified representation of setup signaling in accordance with an embodiment of the present invention. Other message and network elements may added and other configurations are possible.

At a step 514, a mobile node (MN) 502, establishes a mobile IP session via a first network utilizing a home agent (HA) 510. The MN 502 also obtains a home address tied to the HA 510. At a step 516, the MN 502 stores the IP address of the HA 510. Then, at a step 520, the MN 502 establishes a path to a second network via an access gateway (AG) 504. As shown, the AG 504 comprises a proxy function 506. In accordance with proxy mobile IP, the AG 504 utilizes the proxy function 506 to perform session setup signaling on behalf of the MN 502. But as discussed above, the proxy function and other functions described here may also be housed elsewhere on the network. The configurations shown and discussed are merely illustrative examples, and other possible configurations will be apparent to those skilled in the art.

At a step 524, the AG 504 sends an authentication request to the MN 502. Next, at a step 526, the MN 502 sends an authentication response comprising the IP address of the HA 510, previously stored at the step 516. As discussed above, the authentication request and response may be formatted in accordance with various authentication protocols, including EAP, and the IP address of the HA 510 may be included in the response by various means apparent to one skilled in the art.

At a step 528, the AG 504 transmits an authentication message including the IP address of the HA 510 to an Authentication, Authorization, and Accounting Server (AAA) 508. As discussed above, the authentication message may be formatted in accordance with various authentication protocols, including RADIUS and DIAMETER, and the IP address of the HA 510 may be included in the response by various means apparent to one skilled in the art.

At a step 530, the AAA 508 uses the IP address of the HA 510 to generate a mobility key. As described in relation to the step 206 of FIG. 2, more than one mobility key may in fact be generated, but one key is depicted here to simplify the illustration. Further, the AAA 508 associates the mobility key with a network session identifier for the mobile IP session. This association may be stored in a session table keyed on the network session identifier, such as the session table 328 of FIG. 3. At a step 534, session information is transmitted from the AAA 508 to the AG 504, including the mobility key and the network session identifier.

At a step 538, the AG 504 receives a request for an IP address from the MN 502. As depicted here, the request may be delivered by means of a broadcast message, such as a DHCP Discover message. Regardless, at a step 540, the AG 504 generates a registration request message on behalf of the MN 502. As part of this step, the AG 504 hashes the mobility key from the step 534 with an auth. string to create an authenticator value. Both the auth. string and the authenticator value then become part of the registration request message, along with the network session identifier from the step 534.

At a step 542, the AG 504 passes the registration request message built in the step 540 to the HA 510. Then, at a step 544, the HA 510 forwards the registration request to the AAA 508 as part of an access request message. In a step 546, the AAA 508 looks up the mobile IP session using the network session identifier and uses the associated mobility key to hash the auth. string. Next the resulting hash value is compared to the authenticator value. If the values match, the AAA 508 sends an access accept message back to the HA 510 in a step 550. The access request and access accept messages may be formatted in accordance with RADIUS or DIAMETER, amongst other possible protocols.

Next, at a step 552, the HA 510 utilizes the network session identifier from the step 542 to identify the previous mobile IP session established in the step 514. The HA 510 then updates care-of address bindings associated with the mobile IP session to include the IP address of the AG 504. Then, at a step 556, the HA 510 transmits a registration response message back to the AG 504, indicating that the registration request for the MN 502 has been accepted by the HA 510 and reassigning the home address from the step 514 to the MN 502. Finally, at a step 560, the AG 504 transmits a DHCP Offer or similar message to the MN 502, indicating that the home address from the step 514 has been assigned to the MN 502, thereby maintaining the mobile IP session.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more non-transitory computer-readable media having computer-useable instructions embodied thereon for performing a method of maintaining a mobile IP session between a mobile node and a home network when the mobile node moves from a first foreign network to a second foreign network, the method comprising:
   establishing the mobile IP session between the mobile node and the home network through the first foreign network, wherein a home agent is configured to tunnel messages from the home network to the mobile node via a first care-of address on the first foreign network, and the mobile node is assigned a home address;
   establishing a connection to the second foreign network;
   providing, by the mobile node, an IP address of the home agent in response to a request to authenticate the mobile node to the second foreign network and utilizing, by an authentication element on the second foreign network, the IP address of the home agent to generate a mobility key for use in authenticating the mobile node to the second foreign network, wherein information identifying the home agent is used to build the mobility key so as to enable re-assignment of said home agent to said mobile node despite switching by said mobile node from said first foreign network to said second foreign network;
   receiving from the home agent a network registration request message sent on behalf of the mobile node and comprising a message authenticator value;
   performing a hashing function with the mobility key and at least a portion of the network registration request message and comparing a result of the hashing function with the message authenticator value in order to authenticate the mobile node and validate the network registration request message; and
   maintaining the mobile IP session between the mobile node and the home network by configuring the home agent to tunnel messages from the home network to the mobile node via a second care-of address on the second foreign network and reassigning the home agent to the mobile node.

2. The media of claim 1, wherein the first foreign network utilizes a proxy mobile IP protocol, and the first care-of address comprises a network address of a proxy configured to route messages between the home agent and the mobile node.

3. The media of claim 1, wherein the first foreign network utilizes a client mobile IP protocol, and the first care-of address comprises a network address of the mobile node.

4. The media of claim 3, wherein the second care-of address comprises a network address of a proxy configured to route messages between the home agent and the mobile node.

5. The media of claim 4, wherein the proxy generates the network registration request message on behalf of the mobile node and transmits the network registration request message to the home agent.

6. The media of claim 4, wherein the mobile node stores the IP address of the home agent and transmits it to the proxy in response to a request to authenticate the mobile node to the second foreign network.

7. The media of claim 6, wherein the proxy passes the IP address of the home agent to an authenticating element that generates the mobility key.

8. A computer implemented method for maintaining a mobile IP session between a network element and a home network when the network element switches wireless access technologies, the method comprising:
   transmitting an authentication request to the network element, wherein the authentication request is triggered in response to the network element switching from use of a first access technology to use of a second access technology;
   receiving from the network element an authentication response comprising an IP address for a home agent, wherein the home agent was previously assigned to route messages to the network element;
   utilizing the IP address of the home agent to generate a mobility key for use in maintaining a continuous mobile IP session between the network element and the home network when the network element moves from the first wireless access technology to the second wireless access technology, wherein the IP address of the home agent is used to build the mobility key so as to enable re-assignment of said home agent to said network element despite switching by said network element of wireless access technologies;
   receiving a network registration request message sent on behalf of the network element and comprising a message authenticator value; and
   validating the network registration request message by performing a hashing function with the mobility key and at least a portion of the network registration request message, and comparing a result of the hashing function with the message authenticator value in order to authenticate the mobile node.

9. The method of claim 8, wherein the network element comprises a mobile node.

10. The method of claim 9, wherein the network element was previously attached to the network via a first foreign network, and the authentication request is triggered when the mobile node establishes a connection to a second foreign network.

11. The method of claim 10, wherein the second foreign network is configured to use a proxy to route messages between the home agent and the mobile node, and the identifying information is passed from the mobile node to the proxy.

12. The method of claim 11, wherein the network registration request message is received from the home agent.

13. The method of claim 12, further comprising transmitting an acceptance message to the home agent indicating that the network registration request is valid.

* * * * *